Aug. 26, 1958 G. E. HENNING 2,848,739
METHODS OF AND APPARATUS FOR MAKING CELLULAR
PLASTIC PRODUCTS
Filed Sept. 30, 1955 4 Sheets-Sheet 1
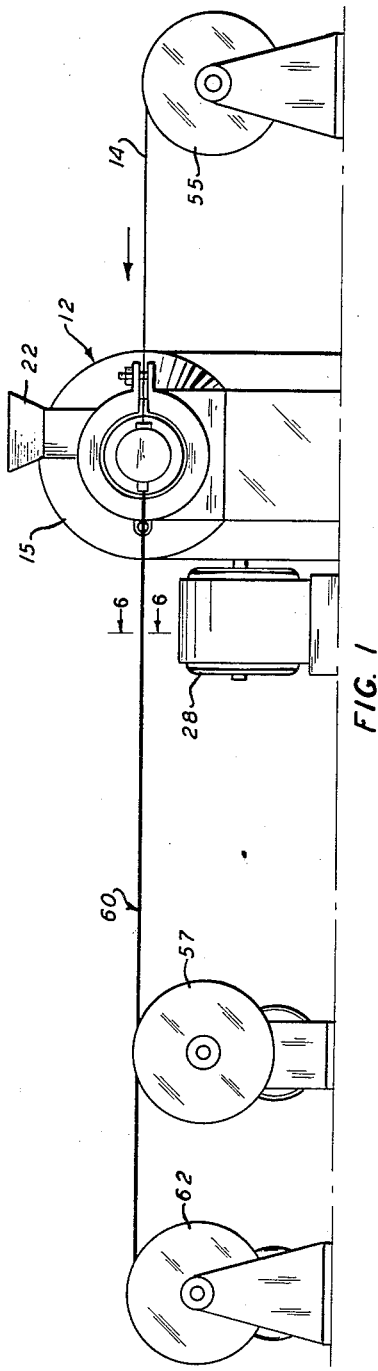
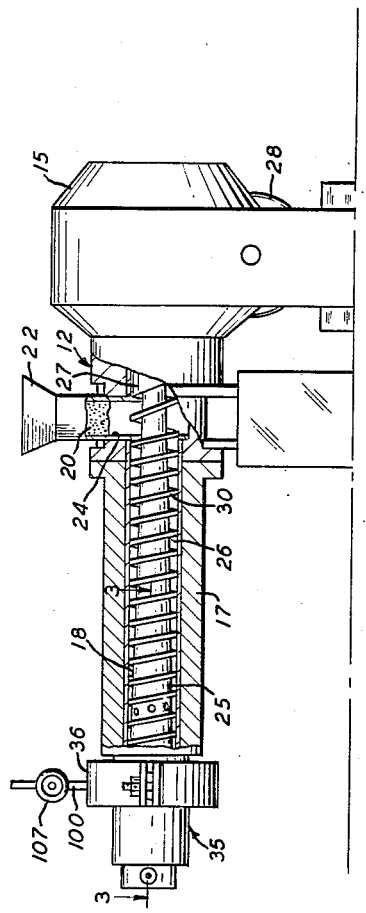
INVENTOR.
G. E. HENNING
BY
ATTORNEY

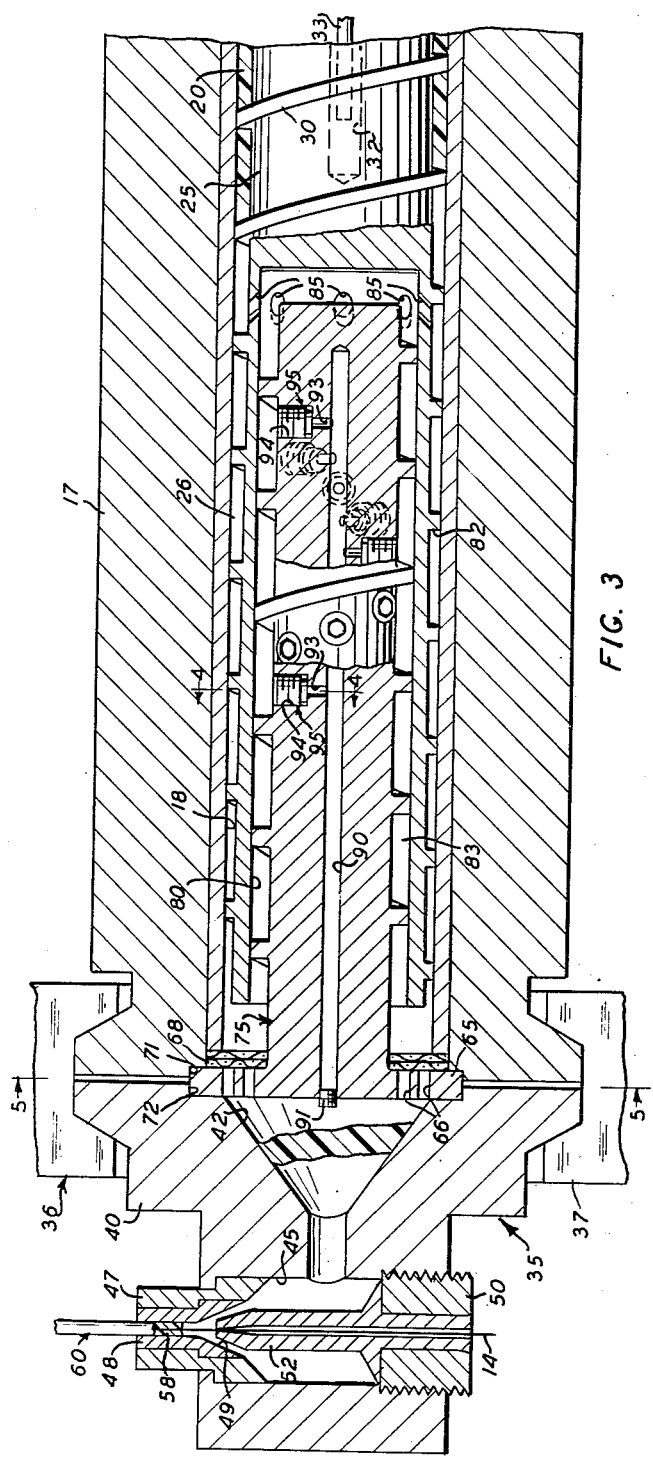

Aug. 26, 1958  G. E. HENNING  2,848,739
METHODS OF AND APPARATUS FOR MAKING CELLULAR
PLASTIC PRODUCTS
Filed Sept. 30, 1955  4 Sheets-Sheet 3

INVENTOR.
G. E. HENNING
BY *(signature)*
ATTORNEY

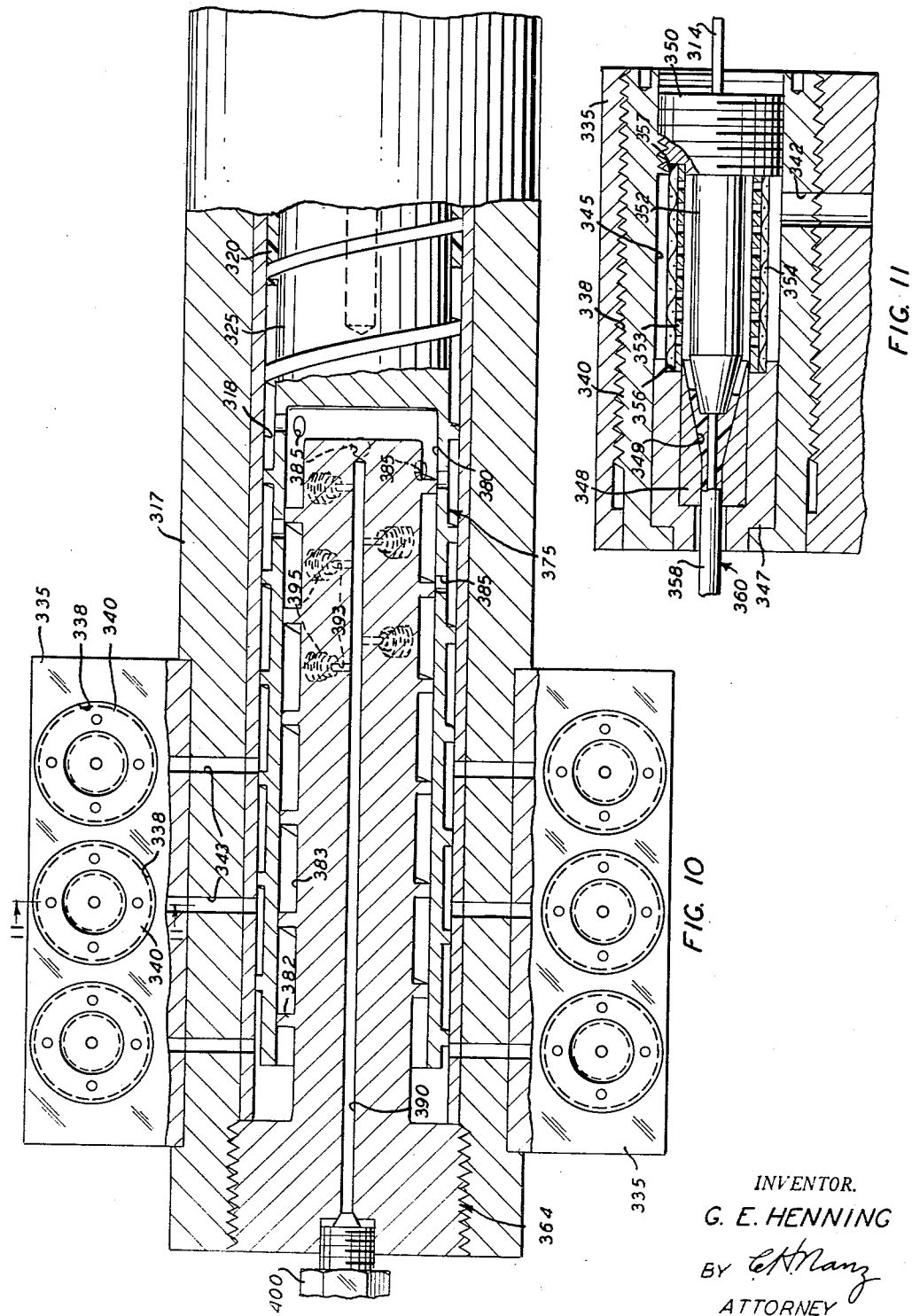

United States Patent Office 2,848,739
Patented Aug. 26, 1958

2,848,739

METHODS OF AND APPARATUS FOR MAKING CELLULAR PLASTIC PRODUCTS

George E. Henning, Baltimore, Md., assignor to Western Electric Company, Incorporated, New York, N. Y., a corporation of New York Application September 30, 1955, Serial No. 537,670

9 Claims. (Cl. 18—12)

This invention relates to methods of and apparatus for making cellular plastic products, and more particularly to methods of and apparatus for simultaneously advancing a plastic material, admixing a normally gaseous expanding medium with the plastic material, and extruding the resulting mixture into an article having a cellular structure.

This application is a continuation-in-part of my copending application, Serial No. 263,752 filed December 28, 1951, for Extruders, now Patent No. 2,740,989 issued April 10, 1956.

The copending application of A. N. Gray, Serial No. 553,205, filed September 8, 1955, discloses related methods of and apparatus for simultaneously advancing plastic material, admixing a normally gaseous expanding medium with the material, and extruding the resulting mixture into an article having a cellular structure.

Heretofore, in the manufacture of insulated conductors, plastic materials, such as polyvinyl halide compounds, nylon, polyethylene, and the like, have been extruded as solid coverings upon continuous conductors of indefinite length. For some purposes, it is desirable to manufacture insulated conductors having insulating coverings which include or consist of organic plastic materials in a cellular state. Conductors insulated in this manner are extremely useful for communication purposes, and are especially useful as components of telephone cables, video cables, and the like.

Polyethylene in particular possesses excellent electrical properties, having a relatively low dielectric constant, low power factor and a very high dielectric strength. It is also impermeable to water and water vapor. The electrical characteristics of multiconductor cables, such as telephone cables, made of conductors insulated with solid polyethylene are superior to those of cables employing paper insulated conductors. However, for given transmission characteristics, the former are more costly to make than the latter because polyethylene is more costly than paper. Also cables employing solid polyethylene insulation must be larger than paper insulated cables for the same voice frequency attenuations because solid polyethylene has a higher dielectric constant than does paper insulation.

By using cellular polyethylene as insulation for the cable conductors, it is possible to obtain the necessary transmission characteristics and dielectric strength in a cable without substantially diminishing the benefits which accrue from the use of solid polyethylene as insulation. By using cellular polyethylene as the insulating material for the conductors of a cable, the cable can be made smaller for the same attenuation than a cable in which paper insulation is employed because the cellular polyethylene has a very low dielectric constant. Additional savings accrue because the presence of relatively large amounts of occluded gas in the cellular polyethylene insulation (e. g. 35% to 55% gas) minimizes the amount of polyethylene required. In consequence, the cost of cellular polyethylene insulation is competitive with that of paper insulation.

It is an object of this invention to provide new and improved methods of and apparatus for making cellular plastic products.

It is another object of this invention to provide new and improved methods of and apparatus for simultaneously advancing a plastic material, admixing a normally gaseous expanding medium with the plastic material, and extruding the resulting mixture into an article having a cellular structure.

A method for making cellular plastic products, illustrating certain features of the invention, may include the steps of forcing plastic material along a conduit toward an opening therein, simultaneously working the plastic material to a viscous fluid state and diverting a portion of the plastic material in its viscous fluid state and recirculating it through at least a portion of the conduit. An expanding medium is introduced into the diverted portion of the plastic material, whereby the plastic material discharged from the opening contains the gaseous expanding medium in a thoroughly dispersed condition.

Apparatus for making cellular plastic products, illustrating certain features of the invention, may include a conduit having an opening therein, and a stock screw mounted rotatably in the conduit for forcing a plastic material therealong toward the opening and simultaneously working the plastic material to a viscous fluid state. Means are provided for diverting a portion of the plastic material in its viscous fluid state before it is discharged from the opening and for recirculating the material within at least a portion of the conduit. Means are provided additionally for introducing an expanding medium into the diverted portion of the plastic material before the latter is recirculated, whereby the plastic material emerging from the opening contains the gaseous expanding medium in a thoroughly dispersed condition.

A complete understanding of the invention may be had from the following detailed description of methods and apparatus forming specific embodiments thereof, when read in conjunction with the appended drawings, in which:

Fig. 1 is a front elevation of extrusion apparatus forming one embodiment of the invention;

Fig. 2 is an enlarged side elevation of an extruder forming part of the apparatus shown in Fig. 1 with parts thereof broken away;

Fig. 3 is an enlarged, fragmentary, horizontal section taken along line 3—3 of Fig. 2 with parts thereof broken away;

Fig. 4 is a fragmentary, vertical section taken along line 4—4 of Fig. 3;

Fig. 7 is an enlarged, fragmentary, sectional view taken along the vertical axis of gas diffuser forming part of an alternative embodiment of the invention;

Fig. 8 is a fragmentary, horizontal section taken along line 8—8 of Fig. 7;

Fig. 10 is an enlarged view of the left hand portion of the extruder shown in Fig. 9 with parts thereof broken away, and Fig. 11 is an enlarged, fragmentary vertical section taken along line 11—11 of Fig. 10.

Figure 5:
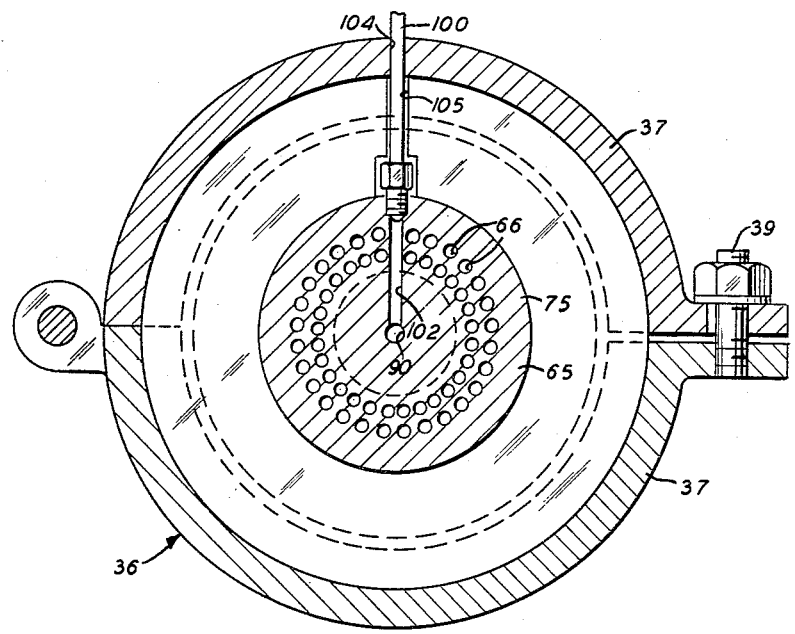
Fig. 5 is a fragmentary, vertical section taken along line 5—5 of Fig. 3.

Referring to Fig. 1, there is shown an extrusion apparatus including an extruder 12 for applying continuously a tubular sheath of a cellular, organic plastic insulating material, such as cellular polyethylene, on a continuously advancing, filamentary conducotr 14, which may be initially bare or may have a textile or other covering thereon. The extruder 12 comprises a housing 15 and an elongated, horizontally extending, extrusion barrel 17 (Figs. 2 and 3) attached thereto. The extrusion barrel 17 is formed with a cylindrical, smooth-walled, extrusion bore 18 extending longitudinally therethrough. An organic plastic compound 20 (e. g. polyethylene), initially in the form of granules, pellets or the like, is fed to the interior of an extrusion bore 18 from a feed hopper 22 through a charging opening 24.

An elongated stock screw 25 is mounted rotatably within the extrusion bore 18 and is provided at its right hand end, as viewed in Fig. 2, with a cylindrical shank portion 27 driven rotatably by an electric motor 28 through a suitable gear train (not shown) mounted within the housing 15. The stock screw 25 is provided with a helical thread 30 having a constant helix angle (e. g. a helix angle of approximately 10° to 30°), which extends from a point on the stock screw immediately to the right of the charging opening 24, as viewed in Fig. 2, to the delivery end of the stock screw.

The thread 30 of the stock screw 25 fits closely within the extrusion bore 18 thereby forming a spiral channel 26 between the stock screw and the wall of the bore. As is evident from Figs. 2 and 3, the root portion of the stock screw 25 tapers longitudinally and diminishes substantially uniformly in cross section from a maximum diameter at the delivery end of the stock screw to a minimum diameter adjacent to the charging opening 24, whereby the channel 26 is quite shallow at the delivery end of the stock screw and relatively deep adjacent to the charging opening. The stock screw 25 may be provided with a longitudinally extending central bore 32 open at the right hand end thereof, in which is positioned a longitudinally extending pipe 33. The pipe 33 may be utilized to circulate a suitable heat exchange medium within the bore 32 for the purpose of controlling the temperature of the stock screw 25 and thus the temperature of the plastic compound 20 as it is advanced along the extrusion bore 18.

An extrusion head 35 is secured detachably to the discharge end of the extrusion barrel 17 by means of a conventional, adjustable, split-ring clamp 36, which comprises two semicircular segments 37—37 hinged at one end and fastened together at the other by a threaded fastener 39. The extrusion head 35 includes a tool holder 40 provided with a central, longitudinally extending, tapered port 42 which forms a continuation of the extrusion bore 18 in the extrusion barrel 17. The left hand end of the port 42, as viewed in Fig. 3, communicates with a cylindrical extrusion passage 45 formed in the tool holder 40 transversely with respect to the port 42.

An annular die holder 47 is mounted at the exit end of the extrusion passage 45 and is designed to receive a centrally mounted extrusion die 48 having a tapered die orifice 49. The opposite end of the extrusion passage 45 is threaded, and received therein is a threaded, annular core tube holder 50. A core tube 52 is supported at one end within the core tube holder 50 and its unsupported end extends axially through the extrusion passage 45 to project partially into the die orifice 49 in substantially concentric relation therewith.

Figure 6:
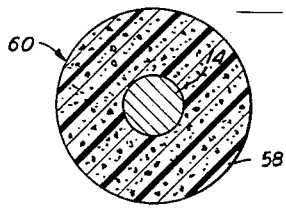
Fig. 6 is an enlarged, vertical section of a finished insulated conductor taken along line 6—6 of Fig. 1.

The conductor 14 is advanced continuously from a supply reel 55 (Fig. 1) from right to left by means of a conventional capstan 57 and passes axially through the core tube 52, the latter guiding the core through the axial center of the die orifice 49. Within the die orifice 49 the conductor 14 is enveloped in a substantially concentric covering 58 (Figs. 3 and 6) of the plastic compound 20 to produce an insulated conductor 60. The finished insulated conductor 60 is taken up on a suitably driven takeup reel 62 (Fig. 1).

Positioned transversely across the discharge end of the extrusion bore 18 and the entrance end of the port 42 in the extrusion head 35 is a circular backing plate 65 provided with a multiplicity of perforations 66—66 formed therein, through which the plastic compound 20 flows from the extrusion bore 18 into the port. The perforations 66—66 are arranged generally in two concentric circles adjacent to the edge of the backing plate 65 and are covered by an annular screen pack 68 positioned against the right hand surface of the backing plate.

The backing plate 65 is secured in place within annular recesses 71 and 72 formed in the opposed faces of the extrusion barrel 17 and the extrusion head 35, respectively. Formed integrally with the backing plate 65 is a central, elongated, gas diffusion cylinder 75, which projects longitudinally to the right, as viewed in Fig. 3, into the extrusion bore 18 in coaxial relation therewith. The right hand end of the gas diffusing cylinder 75, as viewed in Fig. 3, is received coaxially within an elongated, cylindrical mixing chamber 80 formed coaxially within the delivery end of the stock screw 25.

The outer cylindrical surface of the gas diffusing cylinder 75 is spaced from the cylindrical interior wall of the mixing chamber 80 and is provided with a single helical thread 82 which fits closely within the mixing chamber 80 forming a spiral channel 83 between the diffusing cylinder 75 and the wall of the mixing chamber. The thread 30 of the stock screw 25 and the thread 82 on the gas diffusing cylinder 75 both spiral in the same direction. Although the gas diffusing cylinder 75 is stationary, rotation of the stock screw 25 in one direction to advance the plastic compound 20 from right to left along the channel 26, results effectively in the relative rotation of the thread 82 on the gas diffusing cylinder in the opposite direction relative to the interior wall of the mixing chamber 80 whereby the plastic compound within the mixing chamber advances in the opposite direction in the channel 83, that is, from left to right, as viewed in Fig. 3.

The delivery end of the stock screw 25 is spaced longitudinally a short distance to the right of the screen pack 68 and backing plate 65 to permit a portion of the plastic compound 20 advancing along the channel 26 toward the port 42 to be diverted into the mixing chamber 80. The impeller action of the thread 82 on the gas diffusing cylinder 75 forces the plastic compound 20 to the right, as viewed in Fig. 3, along the channel 83. When the plastic compound 20 reaches the rear of the mixing chamber 80, it is forced outwardly through a plurality of openings 85—85 extending radially through the wall of the mixing chamber 80. When the plastic compound 20 is forced through the openings 85—85, it reenters the channel 26 and is recirculated by being forced to the left along the channel 26 toward the discharge end of the stock screw 25.

The gas diffusing cylinder 75 is provided with an axially extending, central bore 90 (Fig. 3) which is closed at both ends. The right hand end of the bore 90 is blind and the left hand end is sealed by a threaded plug 91. Communicating with the passage 90 at equally spaced intervals therealong are a multiplicity of radially extending passages 93—93 which, in turn, communicate with corresponding threaded counterbores 94—94 formed in the cylindrical periphery of the gas diffusing cylinder 75.

Positioned in each of the counterbores 94—94 is a diffuser 95, which includes a thin disc 96 (Fig. 4) made from a suitable porous material. The disc 96 may be made of porous stainless steel, sintered porcelain, or similar material which is sufficiently porous to permit the diffusion of a suitable normally gaseous, expanding medium therethrough at a relatively high rate, but which will not permit the passage of the plastic compound 20 therethrough. The material from which the discs 96—96 are made must also have sufficient strength to withstand the high pressures to which they will be subjected.

The diffusers 95—95 also include threaded retainers 97—97, which are screwed into the counterbores 94—94 to hold the discs 96—96 tightly in place. The retainers 97—97 are provided with central bores 99—99, which permit the normally gaseous expanding medium passing through the discs 96—96 to enter the stream of plastic material advancing along the channel 83.

The normally gaseous, expanding medium is supplied from a high pressure source (not shown), such as a pressure cylinder of suitable design and is conducted to the bore 90 in the gas diffusing cylinder 75 via a pipe 100 (Figs. 2 and 5) connected to a bore 102 extending radially through the backing plate 65 into communication with the bore 90. To facilitate the connection of the pipe 100 to the radial bore 102 in the backing plate 65, one of the segments 37 of the clamp 36 is provided with an aperture 104 and the opposed faces of the extrusion barrel 17 and the extrusion head 35 are provided with matching radial grooves, one of which (in the barrel 17) designated 105 is shown in Fig. 5. A pressure regulating valve 107 (Fig. 2) is provided in the pipe 100 for varying the pressure of the normally gaseous, expanding medium introduced into the bore 90.

OPERATION

In the operation of the extrusion apparatus described hereinabove, the stock screw 25 is rotated continuously in a direction such as to advance the plastic compound 20 from right to left, as viewed in Figs. 2 and 3. For the purpose of this description, it will be assumed that the plastic compound 20 is polyethylene which is introduced in the form of granules from the feed hopper 22 into the extrusion bore 18 through the charging opening 24. The thread 30 on the rotating stock screw 25 picks up the polyethylene granules from the charging opening 24 and forces them constantly along the channel 26 toward the delivery end of the stock screw.

As the polyethylene granules progress toward the left, as viewed in Figs. 2 and 3, the channel 26 becomes progressively shallower and the granules are compacted into a solid plastic mass. This solid plastic mass is worked with increasing intensity as a result of the increasing diameter of the tapered root of the stock screw 25 so as to transform the mass of polyethylene completely into a viscous fluid state before it reaches the vicinity of the openings 85—85 formed in the stock screw 25.

At the delivery end of the extrusion bore 18 a portion of the polyethylene is forced under relatively high pressure through the perforations 66—66 in the backing plate 65 and into the port 42 in the extrusion head 35. The remaining portion of the polyethylene is diverted into the mixing chamber 80 in the delivery end of the stock screw 25 and is advanced along the channel 83 from left to right, as viewed in Fig. 3, by the impeller action of the thread 82 on the gas diffusing cylinder 75. After advancing along the mixing chamber 80, the polyethylene is forced radially through the openings 85—85 whereupon it reenters the channel 26 and is recirculated therealong toward the delivery end of the extrusion bore 18.

As the polyethylene is simultaneously worked and advanced along the mixing chamber 80, a suitable normally gaseous, expanding medium is introduced into the polyethylene through the diffusers 95—95 in the gas diffusing cylinder 75. The normally gaseous, expanding medium employed may be an elementary gas, such as, for example, nitrogen. Manifestly, the pressure of the expanding medium must be sufficient to overcome the pressure of the polyethylene being advanced along the channel 83. Since the polyethylene is in a viscous fluid state and is being worked constantly with a kneading and shearing action, the expanding medium is worked into and thoroughly intermingled with the polyethylene. As a result, except for a brief period following the start-up of the apparatus, a homogeneous mixture of the polyethylene with the expanding medium is forced through the perforations 66—66 in the backing plate 65 and into the port 42 in the extrusion head 35.

The polyethylene with the normally gaseous, expanding medium admixed thoroughly therein, envelopes the continuously advancing conductor 14 in the die orifice 49. The pressure within the extrusion head 35 is sufficiently high to prevent the expanding medium from expanding the polyethylene until it emerges from the extrusion die 48 as the covering 58 of the finished insulated conductor 60, even though the temperature may be of the order of several hundred degrees. As soon as the insulated conductor 60 emerges from the extrusion die 48, the pressure thereon is released suddenly and the expanding medium expands the polyethylene in the covering 58 into a cellular form containing a multiplicity of minute, discrete, gas-filled cells distributed substantially uniformly throughout the covering. The finished product is shown in schematic cross section in Fig. 6.

A desired rate of flow of the plastic compound 20 diverted into the mixing chamber 80 may be established by proper design of the threads 30 and 82. The thread depths and helix angles should be such as to establish relative volumetric efficiencies for the thus formed impellers capable of achieving the desired result. The latter is an important factor in determining the degree of expansion of the final product, since it affects the amount of the expanding medium taken up per unit volume of the plastic compound.

First alternative embodiment

There is shown in Figs. 7 and 8 an alternative form of diffuser that may be used in an apparatus of the type shown in Figs. 1 to 5, inclusive, to replace the diffusers 95—95, such as the one shown in detail in Fig. 4. In this embodiment of the invention, there is provided a diffusing cylinder 175, similar to the gas diffusing cylinder 75. The diffusing cylinder 175 has a plurality of radially extending passages, one of which designated 193 is shown in Fig. 7, communicating with a corresponding threaded counterbore 194 formed in the periphery of the diffusing cylinder.

Positioned in the counterbore 194 is a diffuser 195, which comprises an externally threaded receptacle 200 having a central aperture 201 aligned with the radially extending passage 193. The receptacle 200 is provided with a cavity 202, the upper portion of which is threaded to receive an externally threaded, annular retainer 203 having a central aperture 209. Before the retainer 203 is threaded into the cavity 202, a steel ball 204 is inserted in the cavity. In the final position of the parts, the steel ball 204 is provided with sufficient clearance (e. g. approximately .003 to .005 inch) within the cavity 202 to permit movement between a lower position and an upper position.

In its lower position the steel ball 204 is seated in a recess 205 formed in the receptacle 200 surrounding the central aperture 201. The recess 205 is shaped so that the steel ball 204 in this lower position fits snugly therein so as to seal up the central aperture 201. In its upper position the steel ball 204 is positioned in a recess 206 surrounding the central aperture 209 in the retainer 203. The recess 206 is provided with a plurality of radial grooves 208—208 (Fig. 8) formed in the face thereof, which prevent the ball from sealing the aperture 209 entirely.

Operation of first alternative embodiment

In the operation of the above-described embodiment of the invention a normally gaseous, expanding medium is introduced under pressure to the passage 193. As long as the pressure of the expanding medium exceeds that of the plastic compound adjacent to the diffuser 195, the steel ball 204 will occupy its upper position within the cavity 202 of the receptacle 200. In this position the steel ball 204 is located within the recess 206 and the expanding medium flows through the radial grooves 208—208, into the aperture 209 to become taken up in the plastic compound.

If for some reason the pressure of the gaseous expanding medium should drop below the pressure of the plastic compound adjacent to the diffuser 195, or vice versa, the steel ball 204 will be forced into its lower position. In the latter position it is seated snugly within the conforming recess 205 and seals the aperture 201 to prevent the plastic compound from backing up into the passage 193 in the gas diffusing cylinder 175.

It may be desirable to use a conventional gas filtering means (not shown) in connection with the above-described embodiment of the invention. The gas filtering means would be located between the supply of the expanding medium and the diffusers 195—195 for the purpose of preventing any foreign particles from passing into the plastic compound.

Second alternative embodiment

Figure 9:
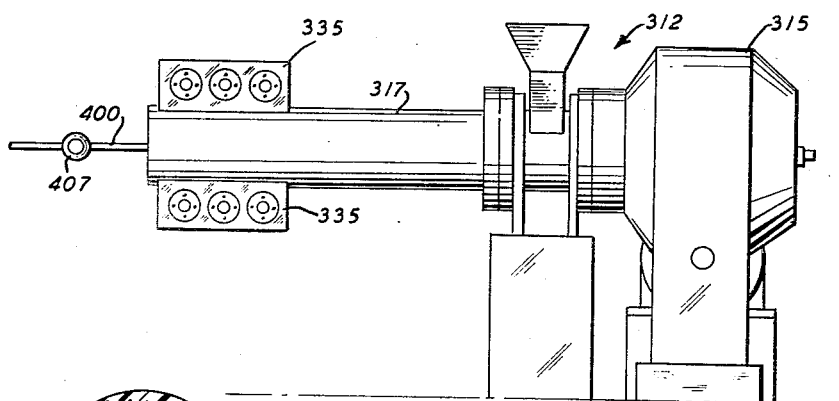
Fig. 9 is a side elevation of an extruder forming part of a second alternative embodiment of the invention.

Referring now to Fig. 9, there is shown an extruder 312 forming a second alternative embodiment of the invention. This extruder is designed to apply simultaneously tubular sheaths of a cellular, plastic insulating material on a plurality of conductors, one of which designated 314 is shown in Fig. 11.

The extruder 312 includes a housing 315 and an elongated extrusion barrel 317 having a cylindrical extrusion bore 318 (Fig. 10) formed therein, in which is mounted rotatably a stock screw 325 substantially identical to the stock screw 25. The stock screw 325 is designed to force a plastic compound 320 to the left, as viewed in Fig. 10, along the extrusion bore 318 toward the delivery end thereof, while simultaneously working the plastic with increasing intensity.

Attached fixedly to the upper and lower sides of the extrusion barrel 317, as shown in Figs. 9 and 10, are extrusion head blocks 335—335. The extrusion head blocks 335—335 are provided with a plurality of internally threaded bores 338—338, the longitudinal axes of which lie spaced equidistantly apart in a common horizontal plane and perpendicular to the longitudinal axis of the extrusion barrel 317. The bores 338—338 are designed to receive externally threaded, tool-holding sleeves 340—340.

As shown in detail in Fig. 11, each of the tool-holding sleeves 340—340 is provided with a radially extending opening 342. The entrance end of each opening 342 normally registers and communicates with a corresponding branch conduit 343 formed in and extending radially through the wall of the extrusion barrel 317. The opposite end of the opening 342 communicates with a cylindrical extrusion passage 345 formed axially through the sleeve 340 in transverse relation with respect to the opening 342. Any one of the branch conduits 343—343 may be shut off from its corresponding extrusion passage 345 by rotating the associated sleeve 340 to move its opening 342 out of registry with the branch conduit.

An annular die holder 347 is mounted at the exit end of the extrusion passage 345, and is designed to receive a centrally mounted extrusion die 348 having a tapered die orifice 349. The opposite end of the extrusion passage 345 is threaded and received therein is a threaded, annular core tube holder 350. The core tube holder 350 supports one end of a core tube 352, and the unsupported end of the core tube extends axially through the extrusion passage 345 to project partially into the die orifice 349 in substantially concentric relation thereto.

A hollow, perforated backing cylinder 353 (Fig. 11) is mounted within the extrusion passage 345 surrounding the core tube 352 coaxially and in spaced relation with respect to the wall of the passage and the periphery of the core tube. The perforated backing cylinder 353 supports an encompassing cylindrical screen pack 354. The opposite ends of both the backing cylinder 353 and the screen pack 354 are received within annular recesses 356 and 357 formed in the die holder 347 and core tube holder 350, respectively.

As shown in Fig. 11, a conductor 314 is advanced continuously, by conventional means, similar to that described in connection with the first-mentioned embodiment of the invention, through the core tube 352. The core tube 352 guides the conductor 314 through the axial center of the die orifice 349 wherein the conductor is enveloped by a covering 358 (Fig. 11) of the plastic compound 320 in a cellular form to produce an insulated conductor 360.

Threadedly received within the left hand end of the extrusion bore 318 in the extrusion bore 317 is an externally threaded, cylindrical plug 364. Formed integrally with the plug 364 is a central, elongated gas diffusing cylinder 375, substantially identical in construction to cylinder 75. The gas diffusing cylinder 75 described in connection with the first-mentioned embodiment of the invention. The gas diffusing cylinder 375 projects longitudinally to the right from the plug 364 into the extrusion bore 318, and the right hand end thereof is received coaxially within an elongated, cylindrical mixing chamber 380 formed coaxially within the delivery end of the stock screw 325.

The outer cylindrical surface of the gas diffusing cylinder 375 is spaced from the cylindrical interior wall of the mixing chamber 380 and is provided with a single helical thread 382 which forms a channel 383 spiralling in the same direction as its counterpart on the stock screw 325. The delivery end of the stock screw 325 is spaced longitudinally from the plug 364 to permit a portion of the plastic compound 320 advancing along the extrusion bore 318 to be diverted into the mixing chamber 380. The impeller action of the thread 382 forces the plastic compound 320 along the channel 383 to the right, as viewed in Fig. 10, to the back of the mixing chamber 380, where the plastic compound is forced through a plurality of openings 385—385 formed radially through the wall of the mixing chamber. The plastic compound 320 forced through the openings 385—385 re-enters the extrusion bore 318 and is recirculated by being forced to the left along the extrusion bore. The openings 385—385 are spaced a predetermined distance to the right, as viewed in Fig. 10, with respect to the entrances of the branch conduits 343—343 formed in the wall of the extrusion barrel 317. The spacing must be sufficiently great to permit the streams of the plastic compound 320 emerging from the openings 385—385 to be thoroughly mixed with the fresh plastic compound advancing along the extrusion bore 318 from the right of these openings.

The plug 364 and the gas diffusing cylinder 375 are provided with an axially extending, central passage 390 which is closed at its right hand end, as shown in Fig. 10. Communicating with the passage 390 at equally spaced intervals therealong are a multiplicity of radially extending passages 393—393 terminating in diffusers 395—395. These diffusers may be identical in construction to either the diffusers 95—95 or the diffusers 195—195 described in detail in connection with the first and second-mentioned embodiments of the invention, respectively.

A gaseous expanding medium is supplied from a high pressure source (not shown) connected to the left hand end of the conduit 390 by a pipe 400 (Fig. 9). A pressure regulating valve 407 is provided in the pipe 400 for facilitating adjustments in the pressure of the gaseous expanding medium in the pasasge 390.

Operation of the second alternative embodiment

In the operation of the extruder 312, the stock screw 325 is rotated continuously in a direction such as to advance the plastic compound 320 from right to left, as viewed in Figs. 9 and 10. It will be assumed that the plastic compound 320 is polyethylene supplied to the extrusion bore 318 in the form of granules. As the polyethylene granules progress toward the left, as viewed in Figs. 9 and 10, they are compacted into a solid plastic mass of polyethylene. This solid plastic mass is worked with an increasing intensity so as to transform the polyethylene completely into a viscous fluid state before it reaches the vicinity of the openings 385—385 formed in the stock screw 325.

At the delivery end of the extrusion bore 318 a portion of the polyethylene in a viscous fluid state is forced under relatively high pressure through the radially extending branch conduits 343—343 in the wall of the extrusion barrel 317 and into the extrusion passages 345—345 in the sleeves 340—340 mounted in the extrusion head blocks 335—335. The remaining portion of the polyethylene is diverted into the mixing chamber 380 in the delivery end of the stock screw 325 and is advanced along the mixing chamber from left to right, as viewed in Fig. 10, by the impeller action of the thread 382 on the diffusing cylinder 375. After advancing along the mixing chamber 380, the polyethylene is forced radially through the openings 385—385, whereupon it enters the extrusion bore 318 and is recirculated toward the delivery end thereof.

As the polyethylene in its viscous fluid state is simultaneously worked and advanced along the mixing chamber 380, a suitable normally gaseous, expanding medium is introduced into the polyethylene through the plurality of diffusers 395—395 on the surface of the gas diffusing cylinder 375. The pressure of the expanding medium must be sufficient to overcome the pressure of the polyethylene being advanced along the mixing chamber 380 so that, as the polyethylene in its viscous fluid state is being worked constantly with a kneading and shearing action, the expanding medium is worked into and thoroughly intermingled with the polyethylene. The result, except for a brief period following the start up of the extruder 312, is a homogeneous mixture of the polyethylene and the expanding medium, which is forced through the branch conduits 343—343. Within each of the extrusion passages 345—345 the polyethylene with the expanding medium admixed thoroughly therein envelops a continuously advancing conductor 314 in the die orifice 349, whereby the conductor is provided with the covering 358 of the polyethylene in a cellular form to form the finished conductor 360.

While in the foregoing description polyethylene has been mentioned as the plastic insulating material employed to produce the cellular plastic insulating covering of the finished insulated conductor, this invention is not restricted to the use of polyethylene as the plastic insulating material. Instead of polyethylene, plasticized polystyrene, polyvinyl halide compounds, copolymers of polyvinyl chloride and polyvinyl acetate, nylon, or other suitable thermoplastic materials may be used to form various extruded cellular plastic products.

Nitrogen has been mentioned as one form of elemental gas that might be used to produce cellular plastic products. In place of nitrogen, other normally gaseous elements, compounds or mixtures thereof may be used as the agent to produce cellular plastic products. Among the other elemental gases that might be employed with satisfactory results are argon, neon and helium.

In addition, normally gaseous organic compounds may be used to expand the plastic material. Among the most important of these are the halogen derivatives of methane and ethane, which are used as refrigerants and for similar purposes, such as chlorodifluoromethane, dichlorodifluoromethane, dichlorofluoromethane, trichlorofluoromethane, difluorotetrachloroethane, dichlorotetrafluoroethane, difluorochloroethane, 1,1-difluoroethane, ethyl chloride, methyl bromide, methyl chloride, and trichlorofluoromethane.

Other normally gaseous compounds that may be employed are acetylene, ammonia, butadiene, butane, butene, carbon dioxide, cyclopropane, dimethylamine, 2,2-dimethylpropane, ethane, ethylamine, ethylene, isobutane, isobutylene, methane, monomethylamine, propane, propylene, and trimethylamine.

All of the aforementioned materials are intended to be embraced within the term "normally gaseous, expanding medium" as used herein and in the annexed claims. This term is intended to mean that the expanding medium employed is a gas under normal atmospheric pressures and temperatures. Also, when reference is made in the annexed claims to the introduction of a normally gaseous, expanding medium or a gas into a plastic compound, it is to be understood that the material introduced is a gas under normal conditions although at the pressure at which it is so introduced it may be in the liquid state.

What is claimed is:

1. The method of making cellular plastic products, which comprises the steps of forcing plastic material along a conduit toward an opening therein, simultaneously working the material to a viscous fluid state, diverting a portion of the material, introducing an expanding medium into the diverted portion, and recirculating the diverted portion through at least a portion of the conduit, whereby the plastic material is discharged from the opening with the expanding medium thoroughly dispersed therein.

2. The method in accordance with claim 1, in which the plastic material employed is a member of the group consisting of polyethylene, plasticized polystyrene, nylon, polyvinyl halides, and copolymers of vinyl chloride and vinyl acetate.

3. The method of making cellular plastic products, which comprises forcing plastic material along a conduit toward a delivery end thereof, simultaneously working the plastic material with increasing intensity and under increasing pressure so that the plastic material reaches the delivery end of the conduit in a viscous fluid state, continuously diverting a portion of the plastic material in its viscous fluid state and recirculating it through at least a portion of the conduit, introducing and mixing a normally gaseous, expanding medium into the diverted portion before it is recirculated so as to cause the expanding medium to become dispersed within the plastic material, and reducing the pressure on the plastic material after it emerges from the delivery end of the conduit whereby the admixed expanding medium is permitted to expand to produce a cellular form of the plastic material.

4. The method of making extruded cellular plastic products, which comprises the steps of introducing plastic material into an extrusion bore at an entrance end thereof, forcing the plastic material along the extrusion bore toward a delivery end thereof and simultaneously working the plastic with increasing intensity and under increasing pressure so that it reaches the delivery end in a viscous fluid state, diverting a portion of the plastic material in this viscous fluid state, injecting and mixing a normally gaseous expanding medium into the diverted portion of the plastic material, forcing the resulting mixture into the extrusion bore at a point closer to the entrance end thereof than the point at which the diversion occurred whereby the material is recirculated along at least a portion of the extrusion bore toward the delivery end thereof, and finally extruding the resulting mixture in a predetermined shape and simultaneously releasing the pressure on the extruded material to cause the expanding medium to expand the extruded material into a cellular product.

5. Apparatus for making cellular plastic products, which comprises a conduit having an opening therein, a screw mounted rotatably in said conduit for forcing plastic toward said opening and for simultaneously working the plastic to a viscous fluid state, means for diverting a portion of the plastic before it is discharged from said opening and for recirculating the plastic through at least a portion of said conduit, and means for introducing an expanding medium into the diverted portion before the latter is recirculated, whereby the plastic material passing through said opening contains the expanding medium in a dispersed condition.

6. Apparatus for making extruded cellular plastic products, which comprises an extrusion cylinder having a longitudinally extending extrusion bore formed therein, a stock screw mounted rotatably within the extrusion bore for forcing plastic material therealong toward the delivery end thereof and simultaneously working the plastic material with increasing intensity so that the material is in a viscous fluid state as it approaches said delivery end, means adjacent to the delivery end of the bore for diverting a portion of the plastic material in its viscous fluid state and recirculating it within at least a portion of the extrusion bore, means for admixing a normally gaseous, expanding medium into the diverted portion prior to its recirculation whereby the plastic material emerging from the delivery end of the extrusion bore contains the expanding medium in a uniformly dispersed condition, and means at the delivery end of the extrusion bore for extruding the resultant mixture into a predetermined shape to form a cellular plastic product.

7. Apparatus for extruding cellular plastic products, which comprises an extruder having a bore therein and having an opening communicating with said bore, a screw mounted rotatably within said bore for working the plastic material and for advancing the material along said bore, said screw having a delivery end toward which the material is advanced by the rotation of said screw and an entrance end away from which the material is moved by the rotation of said screw, said screw having an elongated recess extending from said delivery end toward said entrance end thereof and having a plurality of passages connecting said recess with the exterior of said screw, said passages being located on the exterior of said screw between said opening and said entrance end of said screw, means for diverting a portion of the plastic material into said recess at the delivery end of said screw, means for moving the material along said recess toward said entrance end of said screw and through said passages to be recirculated through at least a portion of said bore, and means for injecting an expanding medium into the plastic material within said recess, whereby the material contains the expanding medium in a thoroughly dispersed condition as the material is forced from said bore into said opening.

8. Apparatus for extruding cellular plastic products, which comprises an extruder having a bore formed therein, said bore having a delivery end, a screw mounted rotatably within said extrusion bore for forcing a plastic material therealong and simultaneously working the plastic material with increasing intensity to a viscous fluid state, said screw having a delivery end toward which said material is forced by said screw, said delivery end of said screw extending substantially to, but spaced from said delivery end of said extrusion bore and having formed therein an elongated cavity, said screw being provided with a plurality of passages extending from said cavity to the exterior of said screw at points spaced longitudinally from said delivery end thereof, means for diverting a portion of the plastic material in its viscous fluid state into the entrance of said cavity at said delivery end of said screw, an elongated member positioned at said delivery end of said extrusion bore and extending into said cavity, said member having a hollow interior and a plurality of vent holes formed in its surface communicating with said hollow interior, means for forcing a normally gaseous, expanding medium under pressure into said hollow interior of said member whereby it is introduced through said vent holes into the plastic material in said cavity, a helical thread provided on the outer surface of said member for working and forcing the plastic material along said cavity and thence through said passages in said screw to be recirculated along said extrusion bore toward said delivery end thereof for uniformly dispersing the expanding medium in the plastic material, and means positioned at the delivery end of the extrusion bore for receiving the resultant mixture and extruding the latter into a predetermined shape to form a cellular plastic product.

9. Apparatus for extruding simultaneously a plurality of cellular plastic products, which comprises the combination of an extruder having a bore therein, a plurality of outlet conduits communicating with said bore, a screw mounted rotatably within said bore for working the plastic material and for advancing the material along said bore, said screw having a delivery end toward which the material is advanced by the rotation of said screw and an entrance end away from which the material is moved by the rotation of said screw, said screw having an elongated recess in said delivery end thereof and having a plurality of passages connecting said recess with the exterior of said screw, said passages opening on the exterior of said screw between said outlet conduits and said entrance end of said screw, means for diverting a portion of the plastic material into said recess at the delivery end of said screw and for moving the material along said recess in the direction of said entrance end of said screw and through said passages to be recirculated through at least a portion of said bore, means for injecting an expanding medium into the plastic material within said recess, a plurality of individual extruding heads, each extruding head having a cylindrical extrusion passage formed therein which communicates normally with a corresponding one of said plurality of outlet conduits, a plurality of cylindrical sleeves each mounted in one of said extrusion passages and each provided with an aperture positioned normally in registry with the corresponding outlet conduit whereby the plastic material containing the expanding medium may enter the associated extrusion passage through said aperture, each of said sleeves being adjustable rotatably to move its aperture out of registry with the associated outlet conduit to prevent the plastic from entering the associated extrusion passage, and means positioned in each of said extruding heads for extruding the plastic into a predetermined shape to form a cellular plastic product.

References Cited in the file of this patent

UNITED STATES PATENTS

| 1,154,674 | Van Ness | Sept. 28, 1915 |
| 1,706,728 | Daniels | Mar. 26, 1929 |
| 2,452,610 | Sonnenfeld | Nov. 2, 1948 |
| 2,740,989 | Henning | Apr. 10, 1956 |

FOREIGN PATENTS

| 138,557 | Great Britain | Feb. 12, 1920 |
| 507,311 | Great Britain | June 13, 1939 |